United States Patent [19]

Rosenberger

[11] 4,218,147

[45] Aug. 19, 1980

[54] APPARATUS FOR DILUTING CONCENTRATED POLYMER SOLUTIONS

[75] Inventor: Roy R. Rosenberger, Wheaton, Ill.

[73] Assignee: Nalco Chemical Company, Oak Brook, Ill.

[21] Appl. No.: 935,218

[22] Filed: Aug. 21, 1978

[51] Int. Cl.² ............................................. G05D 11/02
[52] U.S. Cl. ..................................... 366/162; 366/172
[58] Field of Search ................ 137/604; 366/160, 162, 366/341, 167

[56] References Cited

U.S. PATENT DOCUMENTS

| 4,018,426 | 4/1977 | Mertz et al. | 366/162 |
| 4,057,223 | 11/1977 | Rosenberger | 366/172 |

Primary Examiner—Billy S. Taylor
Attorney, Agent, or Firm—Lloyd L. Zickert

[57] ABSTRACT

The output of mixing devices of the type described in U.S. Pat. No. 4,057,223 may be substantially improved by attaching to the outlet of such mixing devices a vertical line containing flow control means, eductor means, and a long leg which communicates with a discharge line for feeding dilute water-soluble polymer solution. The discharge line is perpendicular to the leg and is fitted with a second flow control means.

While the invention is useful for increasing the efficiency of the devices of the type described in U.S. Pat. No. 4,057,223, it may be adapted to improving other mixing devices.

3 Claims, 5 Drawing Figures

APPARATUS FOR DILUTING CONCENTRATED POLYMER SOLUTIONS

INTRODUCTION

U.S. Pat. No. 4,057,223 discloses a mixing device for mixing viscous fluids with water which comprises a rectangular block containing a pre-mixing chamber, a center section fitted with a bevelled double acting valve capable of restricting fluid flow in two distinct directions, an outlet chamber and recycling means for thoroughly mixing the viscous fluids with the water. The mixing device is able to balance both low and high back pressures, eliminate cavitation and deliver a mixture of viscous fluid and water without serious degradation of the components of the viscous fluids.

More specifically, the mixing block comprises a substantially rectangular block with a bore extending throughout its entire length, said bore having a center section, a first end section and a second end section, with the first end section containing a recycle outlet and defining a pre-mixing chamber for mixing the high viscosity fluids and the water with the second end section defining an outlet port for discharging a mixture of high viscosity fluids and water, a high viscosity fluid inlet nozzle in communication with the premixing chamber, means for determining the pressure within the premixing chamber, adjustable flow restricting means positioned within the center section of the bore, said flow restricting means being adapted to regulate the flow through the pre-mixing chamber and through the second end section wherein the adjustable flow restricting means is a cylindrical plug having a bevelled face in partial communication with the center section of the bore, a recycle inlet in communication with said adjustable flow restricting means and recycling means comprising a pump and fluid conductors connecting the recycle outlet and the recycle inlet for recycling a portion of a mixture of high viscosity fluid and water.

The disclosure of this patent is incorporated hereby by reference and made a part hereof.

This mixing block operates to rapidly and efficiently mix water and high viscosity fluids to produce uniform dispersions, mixtures or solutions thereof.

These devices are particularly suited for producing aqueous solutions of water-soluble polymers by inverting water-in-oil emulsions of these polymers in the presence of an inverting agent. This particular phenomena of inverting polymer-containing emulsions to produce polymer solutions is the subject of U.S. Pat. No. Re. 28,474 and U.S. Pat. No. Re. 28,576. Actual commercial use of the mixing blocks to prepare solutions of polymers by the inversion technique described above have shown the mixing blocks to be capable of rapidly producing concentrated aqueous solutions of high molecular weight water-soluble polymers such as, for instance, polyacrylamide.

In actual usage, it has been found that the mixing blocks rapidly can produce very concentrated solutions of water-soluble polymers by inverting emulsions of these polymers. Thus, it is possible to take a polyacrylamide of relatively high molecular weight, which polymer is in the form of a water-in-oil emulsion, and invert it using the mixing block to produce about an 8% solution.

While the mixing block can produce these concentrated solutions, they are not, per se, capable of being fed directly to applicational areas where such polymers are used, e.g. industrial waste treatment sites, paper mills, sewage plants and the like. To make these polymers suitable for treating such processes, it is necessary that the polymers be diluted from, say, about 8% to ½ to 2%. To produce such dilutions, it is necessary to either use dilution devices such as mixing and storage tanks or to cut back on the output of the mixing block.

If it were possible to utilize the phenomena of making very concentrated solutions of polymers in mixing blocks and then rapidly diluting these solutions to produce polymer solutions capable of being directly fed into the areas where the polymers were used, a substantial advance in the art of polymer dissolution feeding equipment would be afforded.

THE DRAWING

FIG. 1 is a vertical plan view showing the invention used in conjunction with a mixing block of the type described in U.S. Pat. No. 4,057,223;

FIGS. 2 to 5 show and describe the mixing block which is employed in a preferred embodiment with the apparatus of the invention wherein:

FIG. 2 is a broken away front view of the mixing block;

FIG. 3 is a top view broken away in part showing the mixing block;

FIG. 4 is a vertical view of the adjustable valve mechanism used to control the pressure within the block; and FIG. 5 is a horizontal schematic view showing the flow patterns which occur within the block when it is used to mix high viscosity fluids with water.

DETAILED DESCRIPTION

Figure 1:
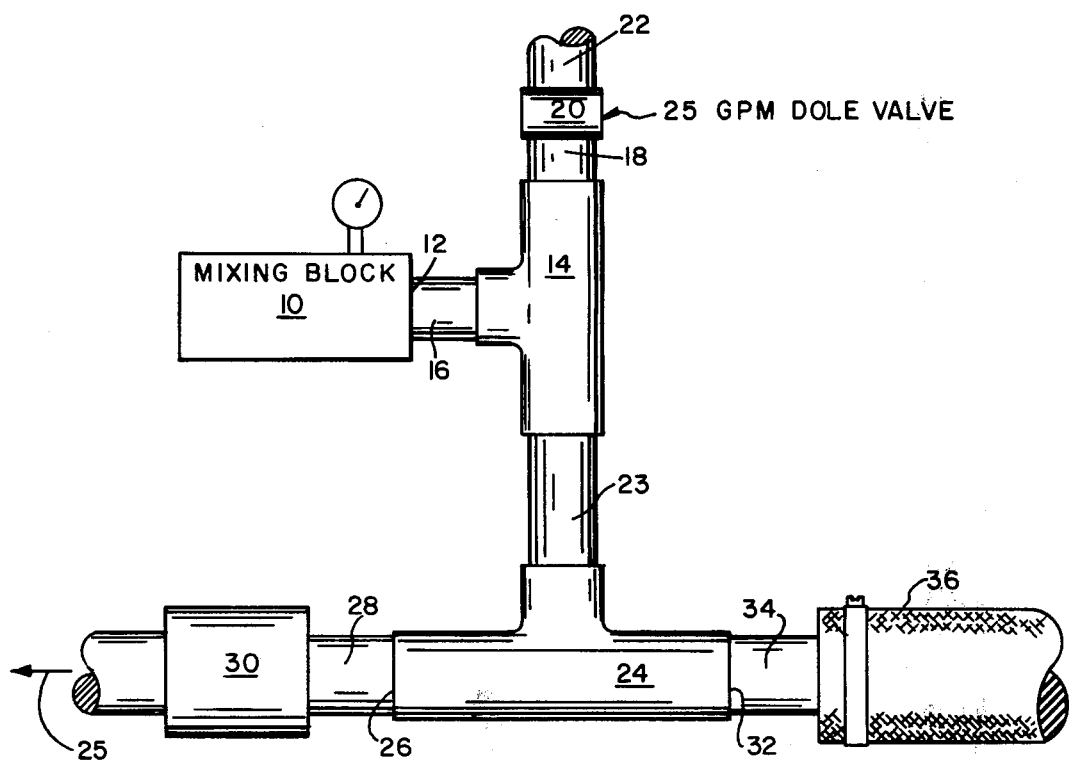

With specific reference to the drawing, there is shown a mixing block of the type shown in U.S. Pat. No. 4,057,223 which is designated generally by the numeral 10. The outlet 12 of the mixing block is connected into T 14 by means of nipple 16.

The top of T 14 is fitted with another nipple 18 to which is attached a flow control valve 20 into which is fed water from a source not shown by means of line 22.

The flow control valve 20 is preferably a "Dole" valve which is a variable elastomic orifice type flow regulator. Valves of this type are described in one or more of the following U.S. patents: U.S. Pat. No. 2,389,134, U.S. Pat. No. 2,454,929, and U.S. Pat. No. 2,775,984.

The bottom of T 14 is fitted with a suitable fluid conductor such as pipe 23 which represents a leg, the bottom portion of which is perpendicularly fitted into T 24. The inlet 26 of T 24 contains a suitable nipple 28 onto which is fitted a second flow control valve 30 into which is pumped water through line 25 from a source not shown. The outlet 32 of T 24 is fitted with a nipple 34 and a flexible rubber hose extension 36 which conducts diluted polymer solution to the area intended to be treated.

To illustrate the operation of the apparatus of the invention the following is presented:

A small mixing block 10 would typically have an outlet delivery rate of 25 gallons per minute. This block would be capable of preparing an 8% solution of polyacrylamide formed by inverting a water-in-oil emulsion of an acrylamide polymer using a surfactant-inverter in accordance with the teachings of U.S. Pat. No. Re. 28,474 and U.S. Pat. No. Re. 28,576.

This 8% solution would then be fed into T 14 which, in combination with the piping 22–18, flow control valve 20 and leg 23, make up a vertical line which is substantially perpendicular to the outlet 12 of the mixing block. The flow control valve 20 would be sized to provide a flow rate of 25 gallons per minute. The water being pumped through the flow control valve as well as T 14 and line 23 would be mixed with the polymer solution leaving mixing block 10. T 14 functions as an eductor to aid in solution dilution, thereby increasing the mixing in the leg 23. The length of leg 23 along with the amount of eduction in the T tends to control the amount of mixing achieved. Leg 23 should be relatively long since most of the mixing occurs here.

It is now evident that the polymer solution leaving the leg 23 has been diluted to provide a 4% solution. This dilute solution, upon entering T 24, is further diluted in T 24 and lines 34 and 36 by sizing flow control valve 30 to produce a flow rate of 50 gallons per minute. Also, the pipe sizing of T 24 and lines 26–32 would be somewhat larger than the leg 23. In this particular instance, the finished polymer solution would contain approximately 2% polymer which would be completely dissolved.

It becomes evident that the particular dilution can be controlled in many ways, e.g. the output of the mixing block and the ratio between flow control valves 30 and 20. In a preferred embodiment of the invention, the output ratio in terms of gallons per minute between discharge flow control valve 30 and the flow control valve 20 should be greater than 1 although they may be 1.

The invention is susceptible to modification without departing from the spirit thereof. The mixing block 10 may be substituted by more conventional mixing devices such as tanks with stirring devices and appropriate pumps. The T 14 may be replaced by a more sophisticated type of fluid eductor. The water supply going into the flow control valves 20 and 30 may be supplied by a pumping system that is either the same one used to operate the mixing block or it may be an independent pumping system.

With respect to the mixing block described in U.S. Pat. No. 4,057,223 and which the apparatus of the instant invention is designed to function with in a preferred embodiment, there is described with specific reference to the drawings and in particular, FIG. 2, there is shown the mixing block which is generally designated by the number 10. The block has a front 11, a back 11a, a top 13, a bottom 15, a first end 17 and a second or discharge end 19.

The block 10 is so constructed that it contains throughout its longitudinal axis a bore 21. The bore is so constructed that its center section 23 is substantially cylindrical and is of relatively small diameter in relation to the remainder of the bore.

Figure 2:
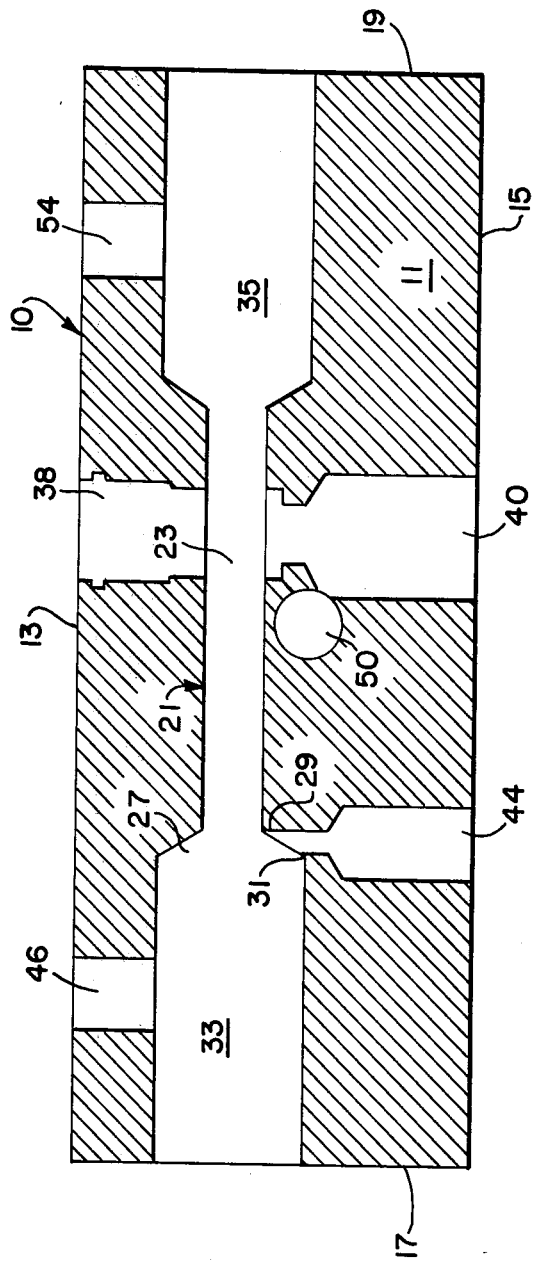
Figure 3:
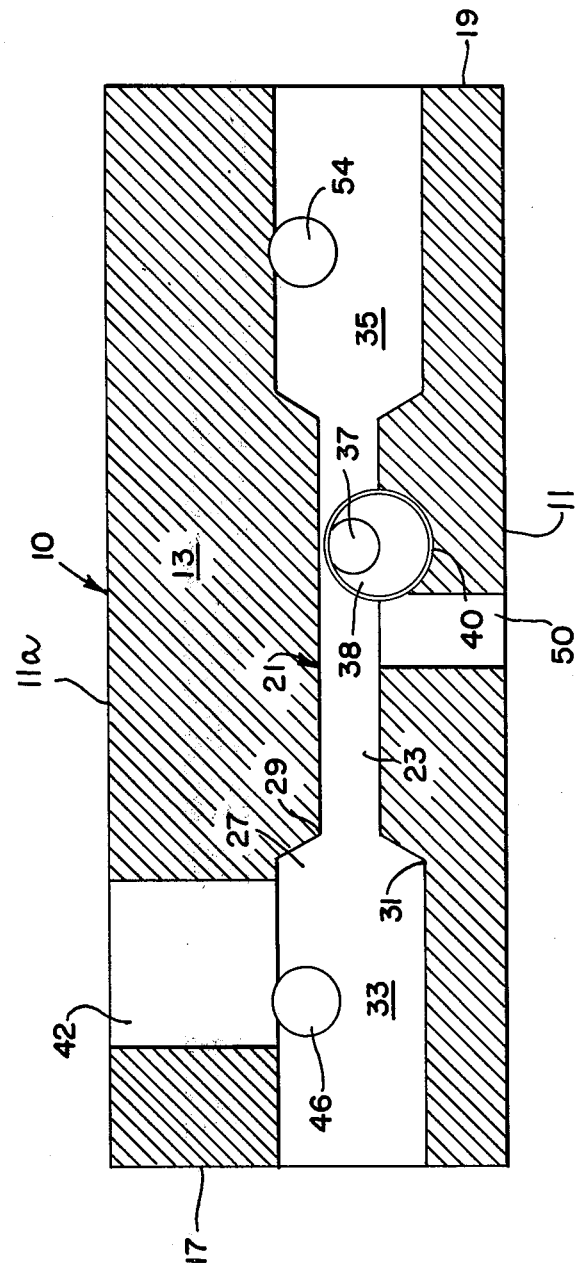
Figure 4:
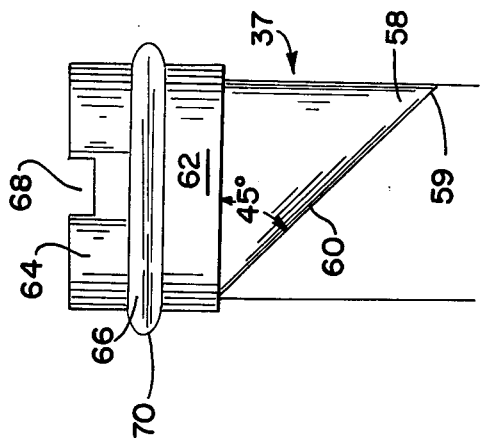

As shown in FIGS. 2 and 3, the left end of the center section of the bore is flared. This flared section, generally designated by the numeral 27, is composed of an apex 29 and a base portion 31. Continuing from the base of the flared section 27, the bore forms left section 33 which opening extends throughout the remainder of the block and exits through end 17. It should be noted that this larger section 33 is of substantially greater diameter than the center section 23 of the bore 21.

The other end of the bore is constructed similarly to section 33. This right section, designated generally by the numeral 35 is constructed so that its beginning flares outwardly from the center section. The right section 35 terminates at the end of the block 19.

Thus, it can be seen that the bore of the block contains three distinct zones or compartments. The portion of the bore designated 33 may be considered as a premixing chamber, whereas the center section 23 is a mixing chamber, as will be more fully explained thereinafter, the right section 35 is an outlet chamber.

The bottom 15 of the block 10 contains a recycle inlet 40 which communicates with the center section 23.

The top 13 of the block 10 contains an opening 38 which communicates with the center section 23 and the recycle inlet 40. The axis of opening 38 is offset from the axis of recycle inlet 40. An adjustable valve 37 is fitted into opening 38 and communicates with the center section 23, the recycle inlet 40 and the discharge end 19.

The adjustable valve is generally designated by the numeral 37 and is in the form of a cylindrical plug. The valve is constructed so that its bottom portion 58 has a bevelled face 60 which terminates at tip 59. The upper portion of the valve contains two circumferential shoulders with the bottom shoulder 62 being parallel to the top shoulder 64 and separated therefrom, thereby defining a groove 66 which is fitted with an O-ring 70. The top circumferential shoulder 64 contains a slot 68 which allows the valve 37 to be adjusted by mechanical means such as a screwdriver blade.

A water inlet 42 is located in the back of the mixing block and is in communication with the left section 33.

A high viscosity fluid inlet 44 is located in the bottom 15 of the block and is positioned so as to communicate with the apex of the flare 27 and the center section 23.

Figure 5:
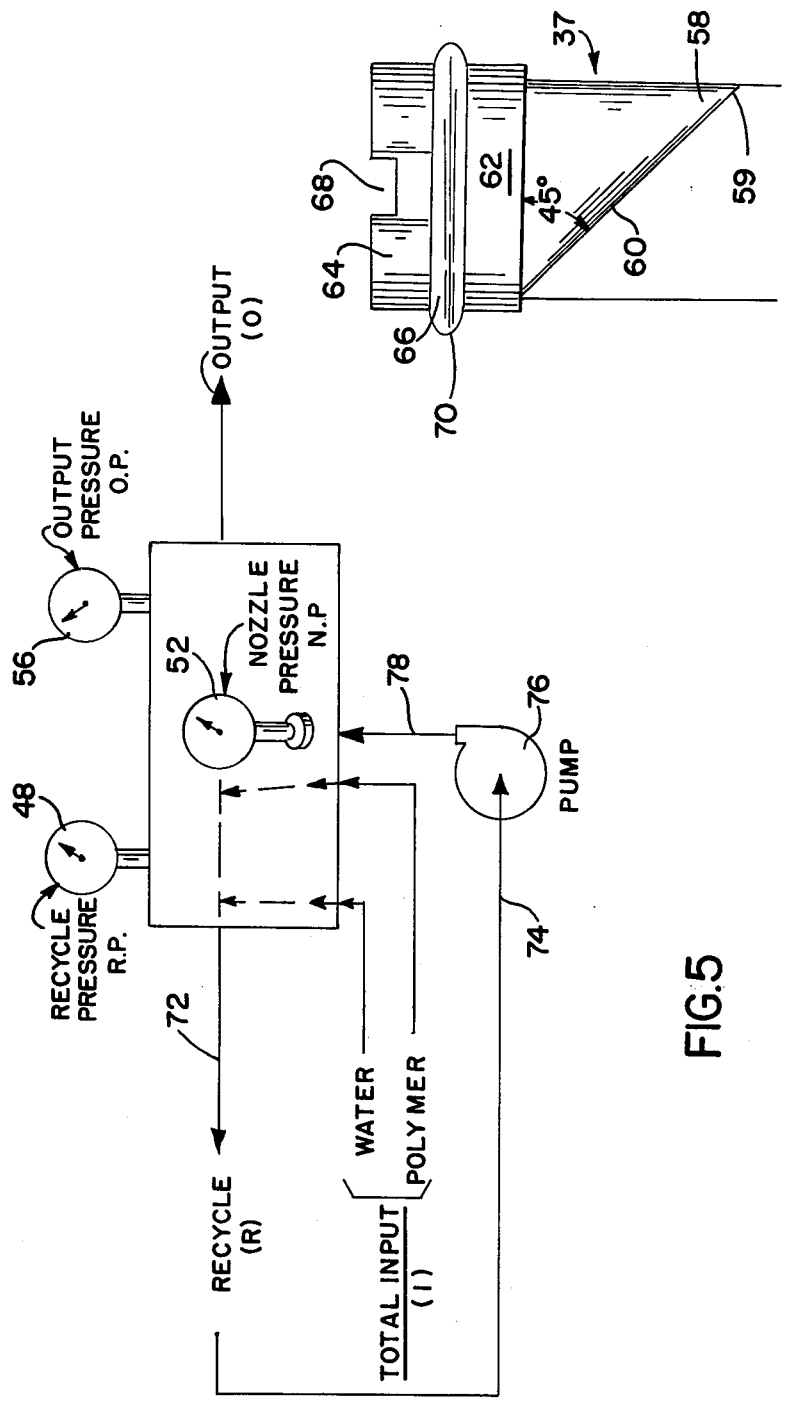

A recycle pressure gauge port 46 is located in the top 13 of the mixing block and communicates with the left section 33. The recycle pressure gauge port is fitted with a pressure gauge 48, as shown in FIG. 5.

The block 10 optionally includes a nozzle pressure valve port 50 and a nozzle pressure gauge 52. The nozzle pressure gauge port is located in the front 11 of the block in communication with the recycle inlet 40. The nozzle pressure gauge port is fitted with a nozzle pressure gauge 52, as shown in FIG. 7.

The block 10 optionally includes a discharge or output pressure gauge port 54 and a discharge or output pressure gauge 56. The output pressure gauge port is located in the top 13 of the block in communication with the right center section 35. The output pressure gauge port 54 is fitted with an output pressure gauge 56, as shown in FIG. 5.

The mixing block operates to rapidly and efficiently mix water and high viscosity fluids to produce uniform dispersions, mixtures or solutions thereof. Water from a source not shown is fed into the mixing block through water inlet 42. Latex polymer is fed into the mixing block through high viscosity fluid inlet 44.

The high viscosity fluid inlet 44 is positioned so that it communicates with the apex 29 of the flare 27 and the center section 23. A venturi effect is achieved by this design whereby the latex polymer is educted into the latex-water mixture which is flowing past the flare 27. This causes excellent lowshear type mixing to occur.

As shown to best advantage in FIG. 5, the end of the left section is fitted with a fluid conductor or line 72 which conducts the water and latex polymer to the input side 74 of the centrifugal pump 76 where the two components are blended and discharged through line 78 into recycle inlet 40 of the mixing block. The left section 33, the line 72, the centrifugal pump 76, the line 78 and the recycle inlet define a recycle circuit. As seen in FIG. 2, when the mixture of latex polymer and water enters the mixing block through recycle inlet 40, it is channeled upwardly into the center section 23 of the bore 21. As the mixture of water and latex polymer emerges into the center section 23, it comes in contact with the adjustable valve 37.

Having thus described my invention, it is claimed as follows:

1. An improvement in apparatuses for diluting concentrated aqueous solutions of water-soluble polymers of the type having an inlet and an outlet, and a mixing zone therebetween, the improvement which comprises a substantially vertical line fitted to the outlet with the vertical line containing a first flow control means, T means and a leg, said T means being positioned between said first flow control means and said leg and being connected to said outlet, a discharge line for feeding dilute water-soluble polymer solution, means connecting said discharge line to the bottom of the leg, said discharge line being substantially perpendicular to said vertical line, said discharge line being fitted with a second flow control means and means for supplying water to the vertical line and the discharge line, with the first flow control means being upstream of the T means and the second flow control means being between the means for supplying the water to the discharge line and the vertical line.

2. The apparatus of claim 1 where the source of concentrated polymer solution is a mixing block comprising a substantially rectangular block with a bore extending throughout its entire length, said bore having a center section, a first end section and a second end section, with the first end section containing a recycle outlet and defining a pre-mixing chamber for mixing the high viscosity fluids and the water with the second end section defining an outlet port for discharging a mixture of high viscosity fluids and water, a high viscosity fluid inlet nozzle in communication with the pre-mixing chamber, a water inlet in communication with the pre-mixing chamber, means for determining the pressure within the pre-mixing chamber, adjustable flow restricting means positioned within the center section of the bore, said flow restricting means being adapted to regulate the flow through the pre-mixing chamber and through the second end section wherein the adjustable flow restricting means is a cylindrical plug having a bevelled face in partial communication with the center of the bore, a recycle inlet in communication with said adjustable flow restricting means and recycling means comprising a pump and fluid conductors connecting the recycle outlet and the recycle inlet for recycling a portion of a mixture of high viscosity fluid and water.

3. The apparatus of claim 2, wherein the flow control valve is positioned above the T means.

* * * * *

UNITED STATES PATENT AND TRADEMARK OFFICE
CERTIFICATE OF CORRECTION

PATENT NO. : 4,218,147
DATED : August 19, 1980
INVENTOR(S) : Roy R. Rosenberger

It is certified that error appears in the above-identified patent and that said Letters Patent are hereby corrected as shown below:

Col. 4, lines 7-8, change "thereinafter" to --hereinafter--; and

Col. 6, line 20, after "center" insert --section--.

Signed and Sealed this

Twenty-fifth Day of November 1980

[SEAL]

Attest:

SIDNEY A. DIAMOND

Attesting Officer

Commissioner of Patents and Trademarks